US011165942B2

(12) United States Patent
Liu et al.

(10) Patent No.: US 11,165,942 B2
(45) Date of Patent: Nov. 2, 2021

(54) CAMERA ASSEMBLY AND MOBILE TERMINAL

(71) Applicant: VIVO MOBILE COMMUNICATION CO., LTD., Chang'an Dongguan (CN)

(72) Inventors: Ben Liu, Chang'an Dongguan (CN); Jun Li, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 65 days.

(21) Appl. No.: 16/616,852

(22) PCT Filed: May 10, 2018

(86) PCT No.: PCT/CN2018/086313
§ 371 (c)(1),
(2) Date: Nov. 25, 2019

(87) PCT Pub. No.: WO2018/214742
PCT Pub. Date: Nov. 29, 2018

(65) Prior Publication Data
US 2021/0176382 A1 Jun. 10, 2021

(30) Foreign Application Priority Data

May 25, 2017 (CN) .......................... 201710377347.1

(51) Int. Cl.
*H04N 5/225* (2006.01)
*H04M 1/02* (2006.01)

(52) U.S. Cl.
CPC ......... *H04N 5/2257* (2013.01); *H04N 5/2253* (2013.01); *H04N 5/2254* (2013.01); *H04M 1/0264* (2013.01)

(58) Field of Classification Search
CPC ............... H04N 5/2352; H04N 5/2351; H04N 5/23245; H04N 5/23209; H04N 5/2354;
(Continued)

(56) References Cited

U.S. PATENT DOCUMENTS

2004/0001193 A1* 1/2004 Takaoka ................. G01C 3/085
356/3.03
2007/0237398 A1* 10/2007 Chang ................ G06K 9/00369
382/224
(Continued)

FOREIGN PATENT DOCUMENTS

CN          203912057 U    10/2014
CN          105371963 A     3/2016
(Continued)

OTHER PUBLICATIONS

Chinese Office Action Application No. 201710377347.1; reported on Nov. 26, 2018.
(Continued)

*Primary Examiner* — Abdelaaziz Tissire
(74) *Attorney, Agent, or Firm* — von Briesen & Roper, s.c.

(57) ABSTRACT

The present disclosure provides a camera assembly and a mobile terminal. The camera assembly includes a substrate, a lens, a photosensitive element, an infrared photosensitive sensor and an infrared filter. The photosensitive element, the infrared photosensitive sensor and the infrared filter are arranged between the substrate and the lens; the photosensitive element and the infrared photosensitive sensor are arranged on the substrate and are electrically connected to the substrate; the infrared filter is located at a side of the photosensitive element away from the substrate; infrared light entering through the lens is incident on the infrared photosensitive sensor. Since the infrared photosensitive sensor is integrated in the camera assembly, three functions of photographing, infrared detection and photosensitive detection can be achieved by arranging one hole on a housing of the mobile terminal.

4 Claims, 9 Drawing Sheets

(58) Field of Classification Search
CPC .... H04N 5/243; H04N 5/2353; H04N 5/2257; H04N 5/2254; G03B 17/12
See application file for complete search history.

(56) References Cited

U.S. PATENT DOCUMENTS

| | | | |
|---|---|---|---|
| 2009/0161215 A1 | 6/2009 | Chan | |
| 2011/0019048 A1* | 1/2011 | Raynor | H04N 5/332 348/302 |
| 2012/0057858 A1* | 3/2012 | Kobayashi | H04N 5/2254 396/439 |
| 2012/0147243 A1 | 6/2012 | Townsend et al. | |
| 2014/0138519 A1 | 5/2014 | Wang et al. | |
| 2016/0006913 A1* | 1/2016 | Kettunen | H01L 27/14685 348/374 |
| 2016/0099271 A1 | 4/2016 | Chou et al. | |
| 2017/0054924 A1 | 2/2017 | Chuan et al. | |
| 2017/0085764 A1* | 3/2017 | Kim | H04N 5/23296 |
| 2017/0142303 A1 | 5/2017 | Wang et al. | |
| 2018/0144243 A1* | 5/2018 | Hsieh | G06N 3/0454 |
| 2018/0144466 A1* | 5/2018 | Hsieh | G06T 7/0012 |
| 2019/0191062 A1* | 6/2019 | Ko | H04N 5/2253 |

FOREIGN PATENT DOCUMENTS

| | | |
|---|---|---|
| CN | 105611136 A | 5/2016 |
| CN | 205610701 U | 9/2016 |
| CN | 105991807 A | 10/2016 |
| CN | 106302878 A | 1/2017 |
| CN | 106657737 A | 5/2017 |
| CN | 107040628 A | 8/2017 |

OTHER PUBLICATIONS

Chinese Search Report related to Application No. 201710377347.1 reported on Nov. 9, 2017.
European Search Report Application No. 18606894.4; reported on Apr. 14, 2020.
International Search Report & Written Opinion related to Application No. PCT/CN2018/086313; reported on Jul. 31, 2018.

* cited by examiner

CAMERA ASSEMBLY AND MOBILE TERMINAL

CROSS-REFERENCE TO RELATED APPLICATION

This application is the U.S. national phase of PCT Application No. PCT/CN2018/086313 filed on May 10, 2018, which claims a priority to Chinese Patent Application No. 201710377347.1 filed on May 25, 2017, the disclosures of which are incorporated in their entireties by reference herein.

TECHNICAL FIELD

The present disclosure relates to the field of communication technology, in particular to a camera assembly and a mobile terminal.

BACKGROUND

As is well known, a mobile terminal (such as a mobile phone) in the related art is usually provided with a camera and an infrared photosensitive sensor, thereby realizing three basic functions of photographing, infrared detection, and photosensitive detection. As shown in FIG. 1, in a conventional design scheme, it is usually necessary to provide two light-transmitting holes (A and B) on an outer housing of the mobile terminal for light to enter onto the camera and the infrared photosensitive sensor, thereby realizing the functions of photographing, infrared detection and photosensitive detection. The hole is arranged on the outer housing and needs to be additionally processed. The more holes are set, the more difficult the machining is. Therefore, there is a problem that the mobile terminal in the related art has a high machining difficulty.

SUMMARY

In a first aspect, a camera assembly for a mobile terminal is provided by embodiments of the present disclosure. The camera assembly includes a substrate, a lens, a photosensitive element, an infrared photosensitive sensor and an infrared filter. The photosensitive element, the infrared photosensitive sensor and the infrared filter are located between the substrate and the lens, the photosensitive element and the infrared photosensitive sensor are arranged on the substrate and are electrically connected to the substrate. The infrared filter is located at one side of the photosensitive element away from the substrate. Infrared light entering through the lens is incident on the infrared photosensitive sensor.

In a second aspect, a mobile terminal is provided by embodiments of the present disclosure. The mobile terminal includes a camera assembly. The camera assembly includes the substrate, the lens, the photosensitive element, the infrared photosensitive sensor and the infrared filter. The photosensitive element, the infrared photosensitive sensor and the infrared filter are located between the substrate and the lens, the photosensitive element and the infrared photosensitive sensor are arranged on the substrate and are electrically connected to the substrate. The infrared filter is located at one side of the photosensitive element away from the substrate. The infrared light entering through the lens is incident on the infrared photosensitive sensor.

In the embodiments of the present disclosure, the camera assembly includes a substrate, a lens, a photosensitive element, an infrared photosensitive sensor and an infrared filter. The photosensitive element, the infrared photosensitive sensor and the infrared filter are arranged between the substrate and the lens; the photosensitive element and the infrared photosensitive sensor are arranged on the substrate and electrically connected to the substrate; the infrared filter is located at a side of the photosensitive element away from the substrate, the infrared light entering through the lens is incident on the infrared photosensitive sensor. Since the infrared photosensitive sensor is integrated in the camera assembly, three functions of photographing, infrared detection and photosensitive detection can be achieved by arranging one hole on a housing of the mobile terminal.

BRIEF DESCRIPTION OF THE DRAWINGS

In order to more clearly illustrate the technical solutions of the embodiments of the present disclosure, the drawings to be used in the description of the embodiments of the present disclosure will be described briefly below. Obviously, the drawings in the following description are merely some embodiments of the present disclosure. For hose skilled in the art, other drawings can also be obtained according to these drawings without the inventive labor.

DETAILED DESCRIPTION

Technical solutions of embodiments of the present disclosure will be clearly and completely described below in conjunction with the drawings of the embodiments of the present disclosure. It is apparent that the described embodiments are a part of the embodiments of the present disclosure, rather than all of them. Based on the described embodiments of the present disclosure, other embodiments obtained by those skilled in the art without creative effort shall fall within the protective scope of the present disclosure.

Embodiments of the present disclosure provide a camera assembly and a mobile terminal, to solve the problem that machining the mobile terminal is difficult.

Figure 1:
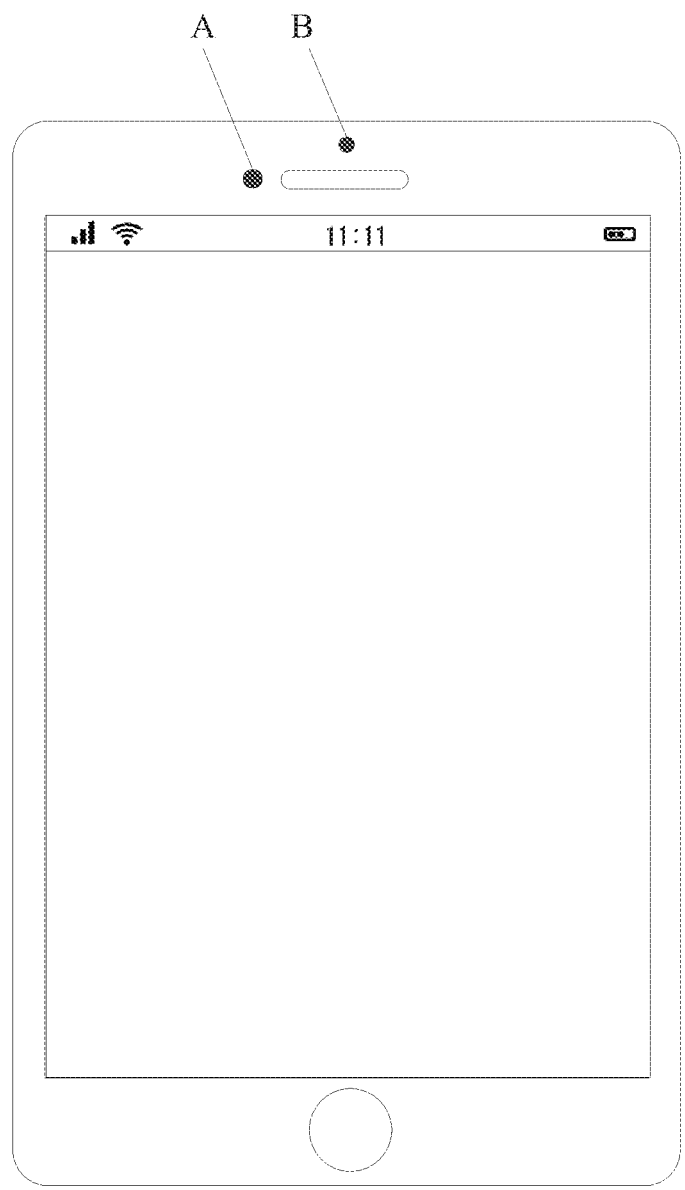
FIG. 1 is a structural view of a mobile terminal in a related art.
Figure 2:
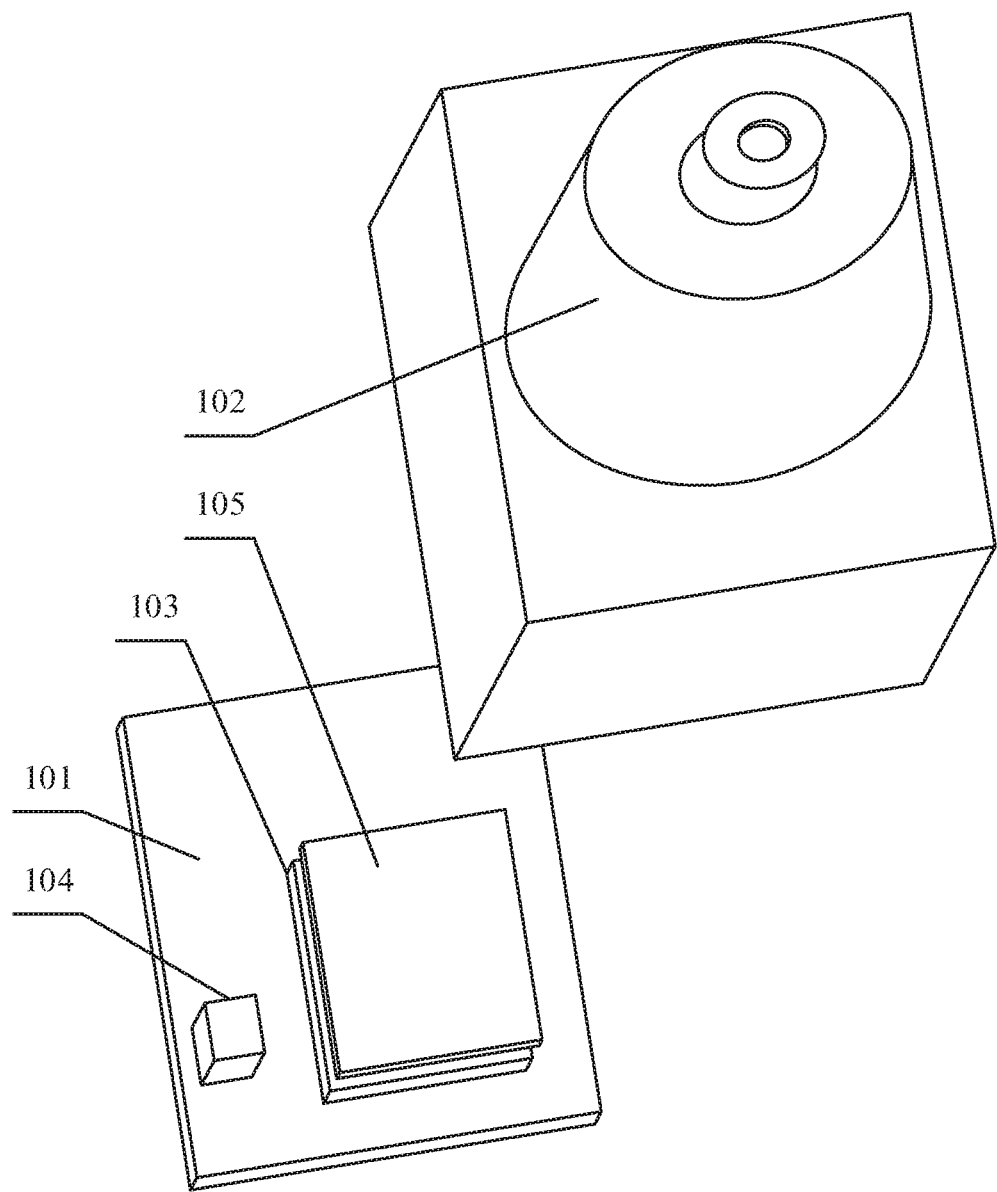
FIG. 2 is an exploded structural schematic view of a camera assembly according to some embodiments of the present disclosure.

Referring to FIG. 2, the present disclosure provides a camera assembly, applied to a mobile terminal. The camera assembly includes a substrate 101, a lens 102, a photosensitive element 103, an infrared photosensitive sensor 104 and an infrared filter 105. The photosensitive element 103, the infrared photosensitive sensor 104 and the infrared filter 105 are arranged between the substrate 101 and the lens 102. The photosensitive element 103 and the infrared photosensitive sensor 104 are arranged on the substrate 101 and electrically connected to the substrate 101, and the infrared filter 105 is located at a side of the photosensitive element 103 away from the substrate 101. Infrared light entering through the lens is enabled to enter on the infrared photosensitive sensor 104.

In some embodiments of the present disclosure, the substrate 101 is a circuit board. The circuit board is provided with a first circuit structure cooperating with the photosensitive element for implementing a photographing function. The circuit board is further provided with a second circuit structure, which cooperates with the infrared photosensitive sensor 104 to implement the functions of infrared detection and photosensitive detection. Specifically, a structure of the first circuit and a structure of the second circuit can be set according to actual requirements, and are not further limited herein.

A structure of the lens 102 can be set according to actual requirements, and will not be further described herein. Specifically, an external light may enter into a space between the lens 102 and the substrate 101 through the lens 102, and may be incident on the photosensitive element through the infrared filter 105, so that the photographing function can be realized. At the same time, the external light is not subjected to infrared filtering and enters on the infrared photosensitive sensor 104. It should be noted that the position of the infrared photosensitive sensor 104 may be arranged according to actual requirements. It is only necessary to ensure that, after the external light passes through the lens 102, the external light is not subjected to infrared filtering, and directly enters on the infrared photosensitive sensor 104, thereby realizing the functions of infrared detection and photosensitive detection.

In the embodiments of the present disclosure, the camera assembly includes the substrate 101, the lens 102, the photosensitive element 103, the infrared photosensitive sensor 104 and the infrared filter 105. The photosensitive element 103, the infrared photosensitive sensor 104 and the infrared filter 105 are arranged between the substrate 101 and the lens 102. The photosensitive element 103 and the infrared photosensitive sensor 104 are arranged on the substrate 101 and electrically connected to the substrate 101. The infrared filter 105 is located at the side of the photosensitive element 103 away from the substrate 101. The infrared light entering through the lens is able to enter on the infrared photosensitive sensor 104. Since the infrared photosensitive sensor 104 is integrated into the camera assembly, three functions of photographing, infrared detection and photosensitive detection can be achieved by arranging one hole on a housing of the mobile terminal. Therefore, the machining difficulty of the mobile terminal is reduced in the present disclosure. Meanwhile, since the number of the holes on the housing of the mobile terminal is reduced, an appearance of the mobile terminal can be more concise and elegant. In addition, since the two components are integrated into one component, it is possible to save an internal space of the mobile terminal and facilitate an arrangement of the overall structure.

It should be understood that the camera and the infrared photosensitive sensor are designed as a whole to increase a reliability of the mobile terminal as a whole.

Specifically, the position of the infrared photosensitive sensor 104 can be arranged according to actual requirements, which will be described in detail below.

As shown in FIG. 2, in a first embodiment, the infrared photosensitive sensor 104 as described above is located outside the projection region of the infrared filter 105 onto the substrate 101.

In the first embodiment, the infrared photosensitive sensor 104 is located outside the infrared filter 105, and external light is directly incident on the infrared photosensitive sensor 104 without passing through the infrared filter 105.

Figure 3:
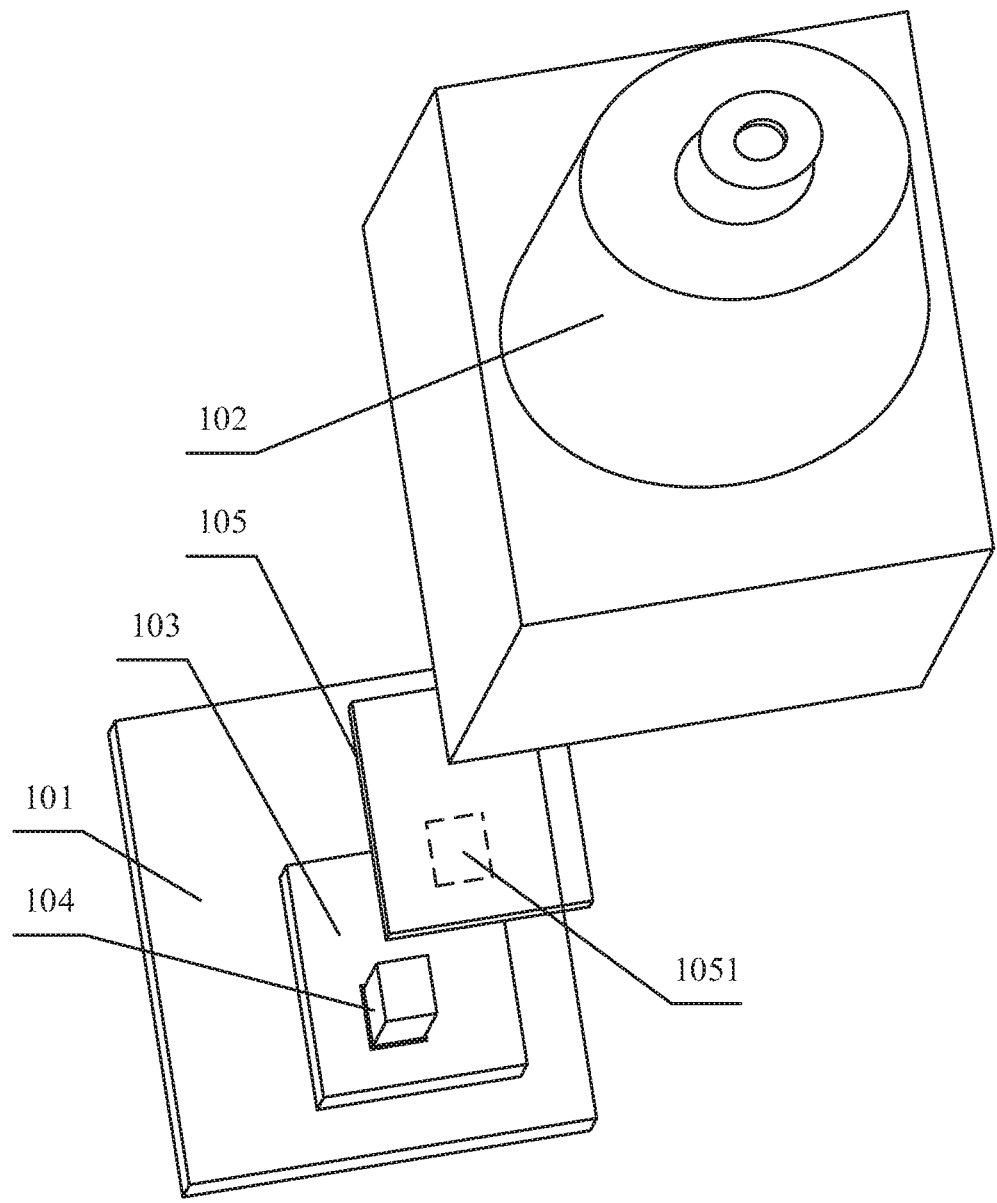
FIG. 3 is an exploded structural schematic view of a camera assembly according to some other embodiments of the present disclosure.
Figure 4:
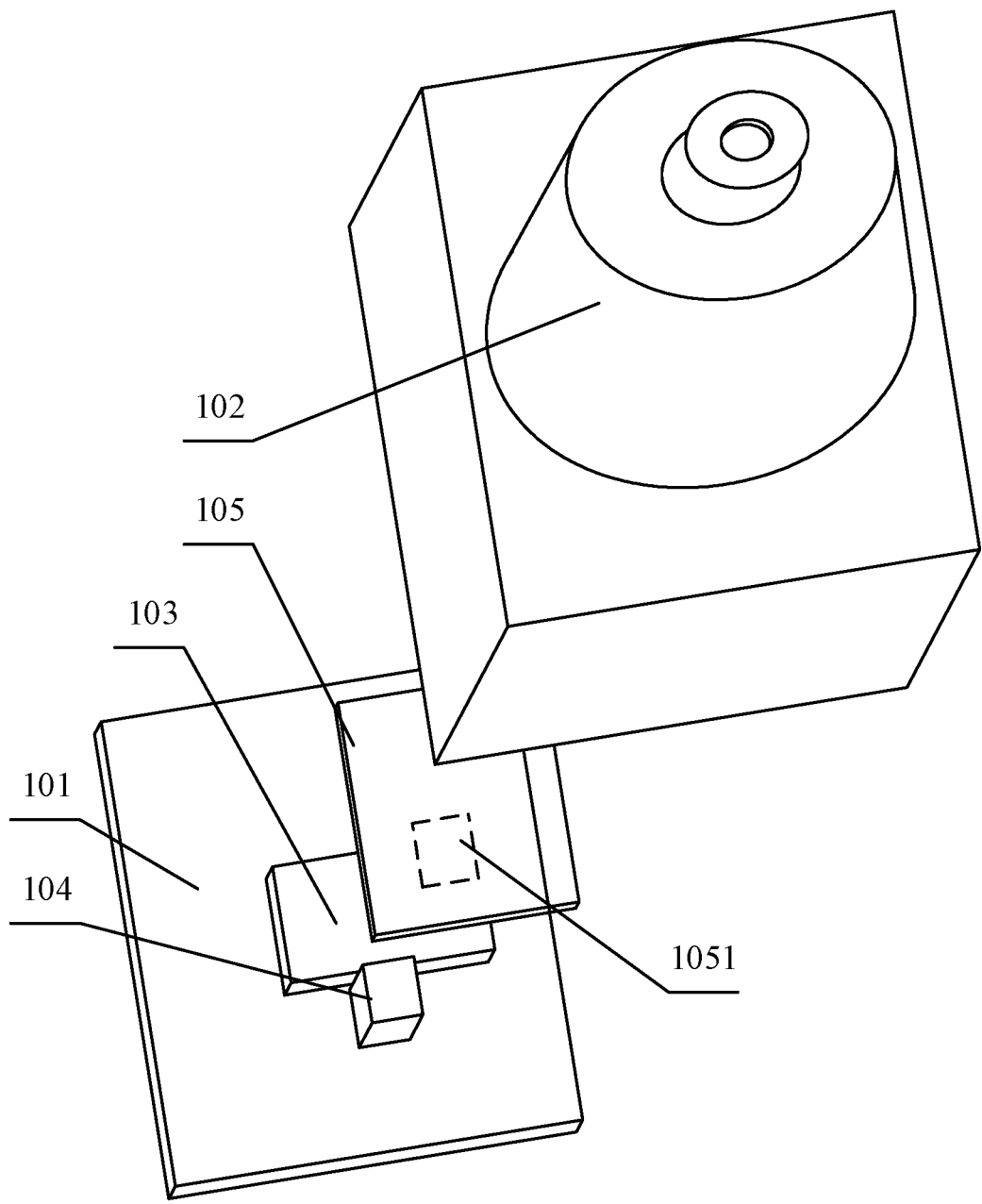
FIG. 4 is an exploded structural schematic view of a camera assembly according to some other embodiments of the present disclosure.

As shown in FIGS. 3 and 4, in a second embodiment, the infrared photosensitive sensor 104 is located within a projection region of the infrared filter 105 onto the substrate 101, and a transparent light-transmitting region 1051 is arranged at a position of the infrared filter 105 aligned with the infrared photosensitive sensor 104.

In the second embodiment, the infrared photosensitive sensor 104 is located between the infrared filter 105 and the substrate 101. The light-transmitting region 1051 is a transparent region and does not achieve any light-filtering effect. For example, the light-transmitting region may be made of glass or plastic.

Figure 5:
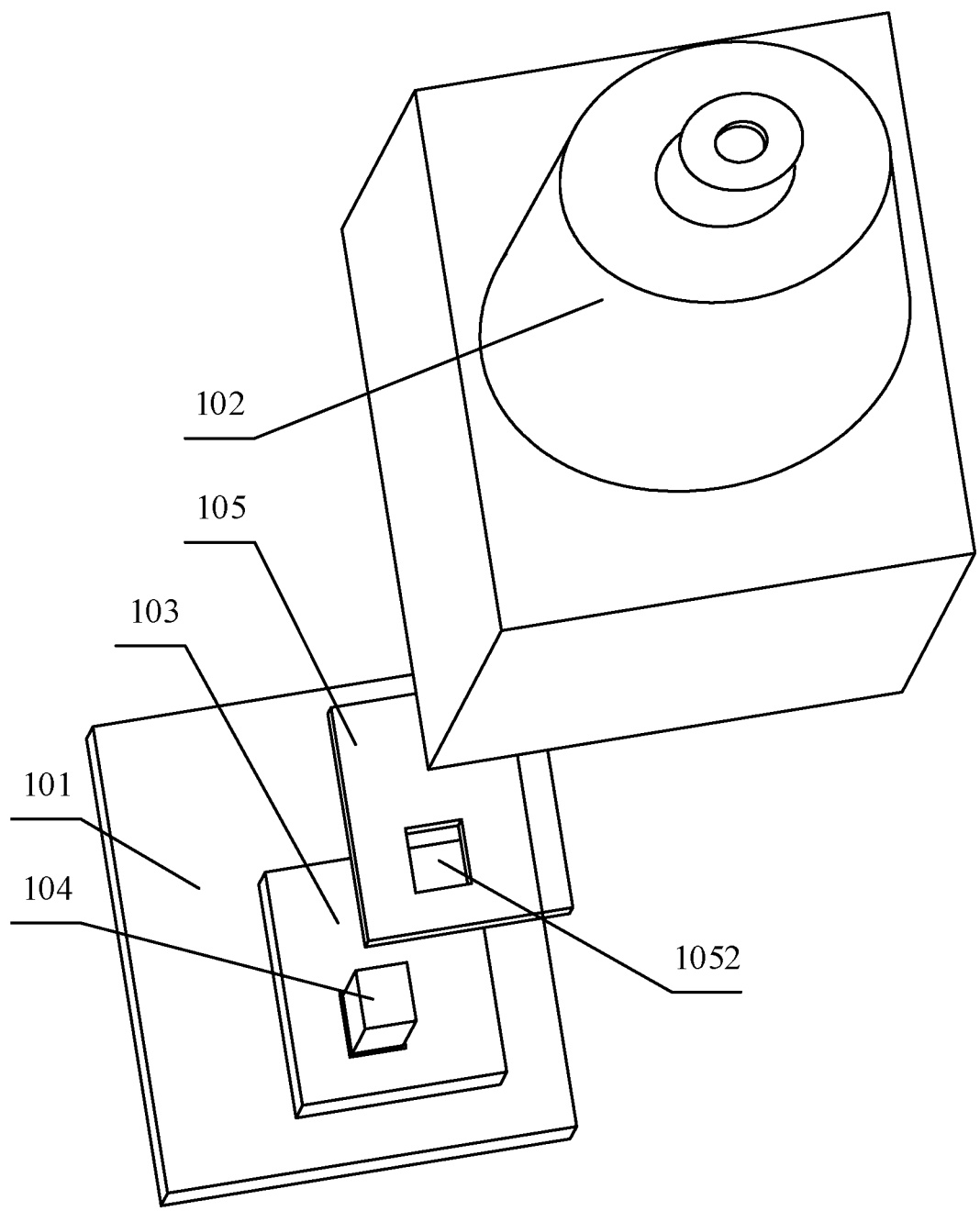
FIG. 5 is an exploded structural schematic view of a camera assembly according to some other embodiments of the present disclosure.
Figure 6:
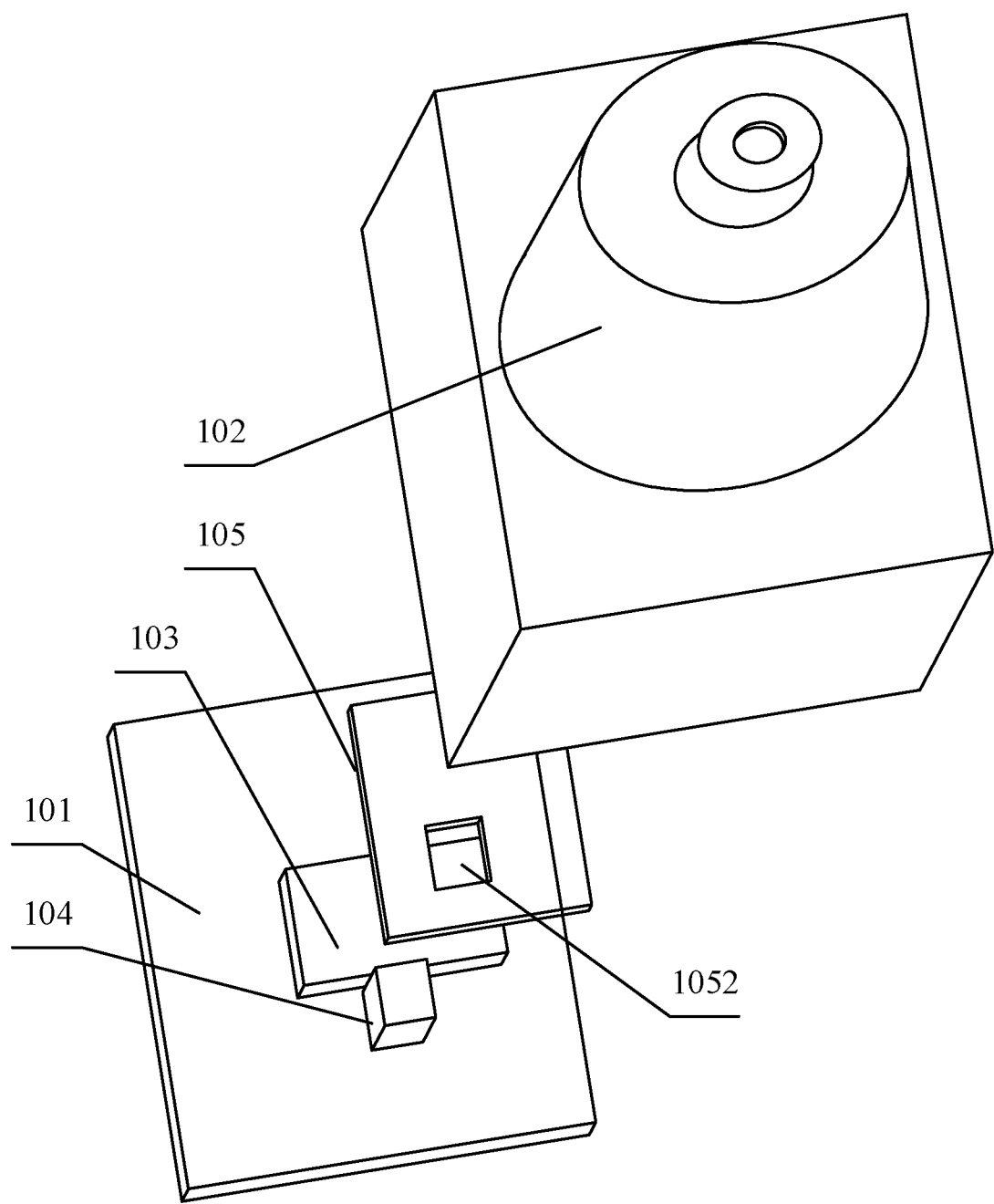
FIG. 6 is an exploded structural schematic view of a camera assembly according to some other embodiments of the present disclosure.

As shown in FIGS. 5 and 6, in a third embodiment, the infrared photosensitive sensor 104 is located within the projection region of the infrared filter 105 onto the substrate 101, and the hole 1052 is arranged at a position of the infrared filter 105 aligned with the infrared photosensitive sensor 104.

In a third embodiment, the infrared photosensitive sensor 104 may be located between the infrared filter 105 and the substrate 101, or may pass through the infrared filter 105. Optionally, an end of the infrared photosensitive sensor 104 away from the substrate 101 passes through the infrared filter 105. That is, the hole 1052 may be smaller than the infrared photosensitive sensor 104 or slightly larger than the infrared photosensitive sensor 104, so that the infrared photosensitive sensor 104 can pass through the infrared filter 105.

It should be noted that the infrared photosensitive sensor 104 is an infrared photosensitive IC (Integrated Circuit). The shape, structure and size of the infrared photosensitive sensor 104 can be set according to actual requirements, and no further limitation is provided herein. The structure of the infrared filter 105 is generally a rectangular structure, and may also be changed into a ring structure by providing the hole 1052.

In addition, the photosensitive element 103 usually forms a photosensitive region. The position and shape of the photosensitive region may be set according to actual requirements. In the present embodiment, the photosensitive region formed by the photosensitive element 103 may be designed as the ring structure. The infrared photosensitive sensor 104 is located in an inner ring of the photosensitive region. As shown in FIGS. 3 and 5, in the case that the photosensitive region has the ring structure, the photosensitive region can be applied to the second embodiment and the third embodiment.

In addition, the photosensitive element 103 may also be set as a rectangular structure, and the infrared photosensitive sensor 104 is located on one side of the photosensitive region where the photosensitive element 103 is formed. As shown in FIGS. 2, 4 and 6, in the case that the photosensitive region has a rectangular structure, the photosensitive region can be applied to the first embodiment, the second embodiment, and the third embodiment.

Further, the present disclosure further provides the mobile terminal. The mobile terminal includes the camera assembly according to the embodiments as described above. The structure of the camera assembly can be referred to the above embodiments, and details are not described herein. Since the mobile terminal is provided with the camera assembly according to the above embodiments, it has the same advantageous effects as the camera assembly in the above embodiments.

Figure 7:
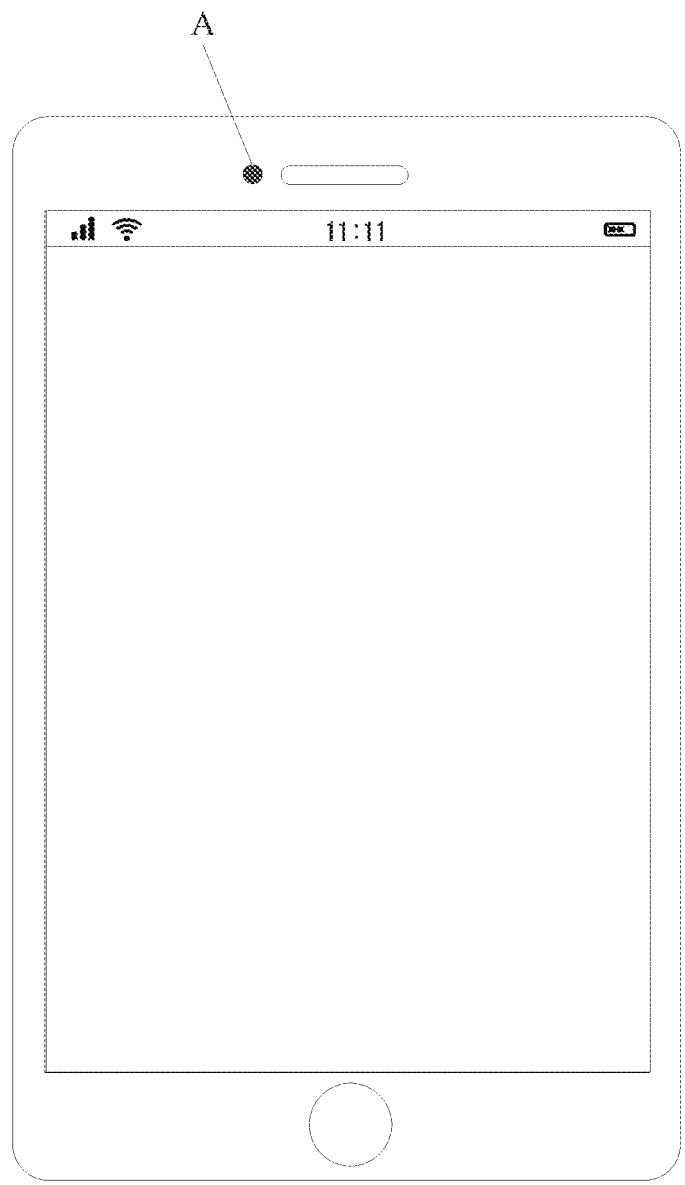
FIG. 7 is a structural schematic view of a mobile terminal according to some embodiments of the present disclosure.
Figure 8:
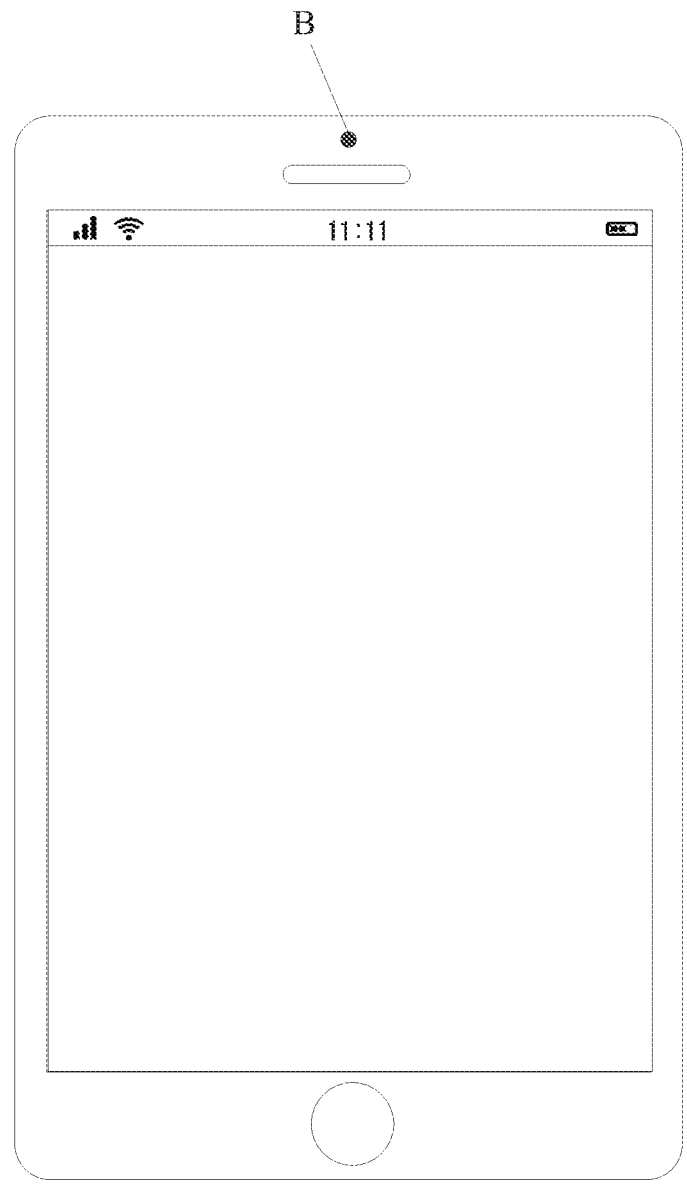
FIG. 8 is a structural schematic view of a mobile terminal according to some other embodiments of the present disclosure.

It should be noted that the position where the camera assembly is installed can be arranged according to actual requirements. In an embodiment, the camera assembly is a front camera component of the mobile terminal. Specifically, as shown in FIG. 7, the camera assembly can be installed at the position of the existing front camera, and only the hole A is retained, thereby omitting the hole B corresponding to the existing infrared photosensitive sensor on the housing of the mobile terminal; as shown in FIG. 8, the camera assembly can be installed at the position of the existing infrared photosensitive sensor, and only the hole B is retained, thereby omitting the hole A corresponding to the existing front camera on the housing of the mobile terminal.

The above mobile terminal may include at least one of a mobile phone, a tablet computer, an electronic book (e-book) reader, an MP4 (Moving Picture Experts Group 4) player, a digital camera, a laptop portable computer, a smart television, or a wearable device.

Figure 9:
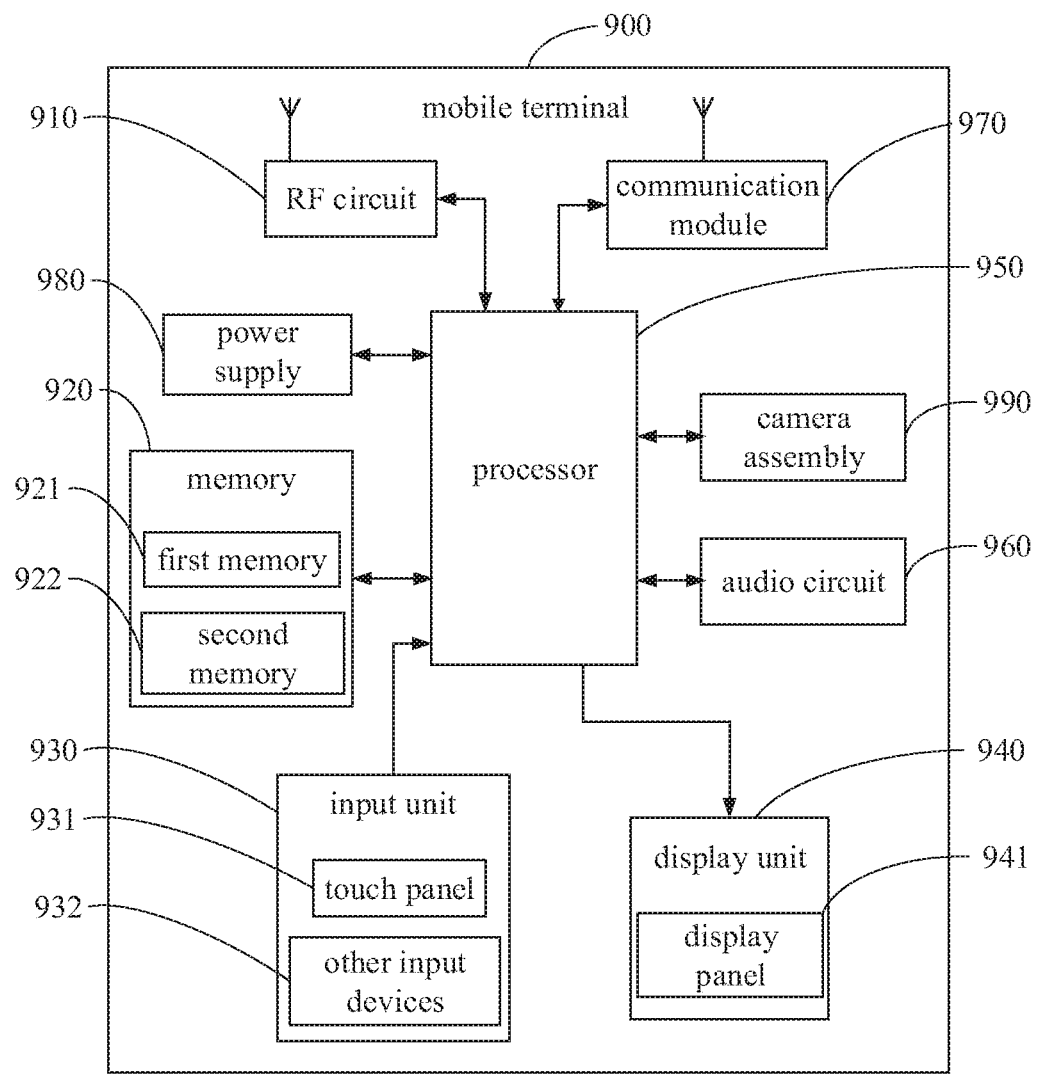
FIG. 9 is a structural schematic view of a mobile terminal according to some other embodiments of the present disclosure.

Reference is made to FIG. 9, which is a structural view of a mobile terminal according to some embodiments of the present disclosure.

As shown in FIG. 9, the mobile terminal 900 includes a radio frequency (RF) circuit 910, a memory 920, an input unit 930, a display unit 940, a processor 950, an audio circuit 960, a communication module 970, a power supply 980 and a camera assembly 990.

Optionally, the camera assembly 990 includes a substrate, a lens, a photosensitive element, an infrared photosensitive sensor and an infrared filter. The photosensitive element, the infrared photosensitive sensor and the infrared filter are arranged between the substrate and the lens, the photosensitive element and the infrared photosensitive sensor are arranged on the substrate and electrically connected to the substrate. The infrared filter is located at one side of the photosensitive element away from the substrate. The infrared light entering through the lens is capable of entering on the infrared photosensitive sensor.

Optionally, the infrared photosensitive sensor is located outside of a projection region of the infrared filter onto the substrate.

Optionally, the infrared photosensitive sensor is located within a projection region of the infrared filter onto the substrate, and a transparent light-transmitting region is arranged at a position of the infrared filter facing to the infrared photosensitive sensor.

Optionally, the infrared photosensitive sensor is located within a projection region of the infrared filter onto the substrate, and a hole is arranged at the position of the infrared filter aligned with the infrared photosensitive sensor.

Optionally, an end of the infrared photosensitive sensor away from the substrate passes through the infrared filter.

Optionally, the photosensitive region formed by the photosensitive element is of the ring structure, and the infrared photosensitive sensor is located in an inner ring of the photosensitive region.

Optionally, the infrared photosensitive sensor is located on one side of the photosensitive element, and the photosensitive region is formed in the side of the photosensitive element.

The input unit 930 may be configured to receive numeric or character information inputted by the user, and to generate signal inputs related to user settings and function control of the mobile terminal 900. Specifically, in some embodiments of the present disclosure, the input unit 930 may include a touch panel 931. The touch panel 931, also referred to as a touch screen, may collect a touch operation on or near the touch panel (for example, the user operates on the touch panel 931 using any suitable object or accessory such as a finger, a stylus, or the like), and drive a corresponding connection device according to a predetermined program. Optionally, the touch panel 931 may include two parts: a touch detection device and a touch controller. The touch detecting device detects a touch orientation of the user, and detects a signal brought by the touch operation, and transmits the signal to the touch controller; the touch controller receives a touch information from the touch detection device, converts the touch information into a contact coordinate, then sends the contact coordinate to the processor 950, and may receive a command from the processor 950 and execute the command. In addition, the touch panel 931 may be implemented in various types such as resistive type, capacitive type, infrared type, and surface acoustic wave type, or the like. In addition to the touch panel 931, the input unit 930 may also include other input devices 932. Other input devices 932 may include, but are not limited to, one or more of a physical keyboard, function keys (such as volume control buttons, switch buttons, etc.), trackballs, mice, joysticks, and the like.

The display unit 940 may be configured to display the information inputted by the user or the information provided to the user and various menu interfaces of the mobile terminal 900. The display unit 940 may include a display panel 941. Optionally, the display panel 941 may be configured in the form of an LCD (Liquid Crystal Display) or an Organic Light-Emitting Diode (OLED).

It should be noted that the touch panel 931 may cover the display panel 941 to form a touch display screen. The touch display screen, after detecting the touch operation on or near it, transmits the touch operation to the processor 950 to determine the type of touch event. Then, the processor 950 provides a corresponding visual output on the touch display screen according to the type of touch event.

The touch display includes an application program interface display region and a common control display region. The arrangement of the application program interface display region and the common control display region is not limited, and may be the arrangement enabling to distinguish the two display regions, such as up-down arrangement, left-right arrangement, or the like. The application program interface display region may be configured to display the interface of the application program. Each interface may include at least one interface elements such as application icons and/or widget desktop controls. The application program interface display region may also be an empty interface that does not include any content. The common control display region is configured to display controls with high usage, such as setting buttons, interface numbers, scroll bars, application program icons (such as phone book icon), and the like.

The processor 950 is a control center of the mobile terminal 900. The processor 950 is connected to various portions of the entire mobile phone by various ports and lines, executes various functions and processing data of the mobile terminal 900 by running or executing software programs and/or modules stored in the first memory 921, and calling data stored in the second memory 922, so as to perform overall monitoring of the mobile terminal 900. Optionally, the processor 950 may include one or more processing units.

The above embodiments are merely specific embodiments of the present disclosure. It should be noted that the scope of the present disclosure is not limited to these embodiments. Any changes or substitutions that are obvious to those skilled in the art within the scope of the present disclosure shall fall within the scope of the present disclosure. Therefore, the scope of protection of the present disclosure should be determined by the scope of the claims.

What is claimed is:

1. A camera assembly for a mobile terminal, comprising a substrate, a lens, a photosensitive element, an infrared photosensitive sensor and an infrared filter,
    wherein the photosensitive element, the infrared photosensitive sensor and the infrared filter are located between the substrate and the lens, the photosensitive element and the infrared photosensitive sensor are arranged on the substrate and are electrically connected to the substrate, and the infrared filter is located at a side of the photosensitive element away from the substrate;
    wherein infrared light entering through the lens is incident on the infrared photosensitive sensor;
    wherein the infrared photosensitive sensor is located within a projection region of the infrared filter onto the substrate, and a position of the infrared filter aligned with the infrared photosensitive sensor is provided with a light-transmitting hole;
    wherein an end of the infrared photosensitive sensor away from the substrate passes through the infrared filter; and
    wherein a photosensitive region formed by the photosensitive element is of a ring structure, and the infrared photosensitive sensor is located in an inner ring of the photosensitive region.

2. A mobile terminal, comprising a camera assembly, wherein the camera assembly comprises a substrate, a lens, a photosensitive element, an infrared photosensitive sensor and an infrared filter,
    wherein the photosensitive element, the infrared photosensitive sensor and the infrared filter are located between the substrate and the lens, the photosensitive element and the infrared photosensitive sensor are arranged on the substrate and are electrically connected to the substrate, and the infrared filter is located at a side of the photosensitive element away from the substrate;
    wherein infrared light entering through the lens is incident on the infrared photosensitive sensor;
    wherein the infrared photosensitive sensor is located within a projection region of the infrared filter onto the substrate, and a position of the infrared filter aligned with the infrared photosensitive sensor is provided with a light-transmitting hole;
    wherein an end of the infrared photosensitive sensor away from the substrate passes through the infrared filter; and
    wherein a photosensitive region formed by the photosensitive element is of a ring structure, and the infrared photosensitive sensor is located in an inner ring of the photosensitive region.

3. The mobile terminal according to claim 2, wherein the camera assembly is a front camera assembly of the mobile terminal.

4. The mobile terminal according to claim 2, wherein the mobile terminal comprises at least one of a mobile phone, a tablet computer, an electronic book reader, an MP4 player, a digital camera, a laptop portable computer, a smart television, or a wearable device.

* * * * *